United States Patent [19]
Larson

[11] 3,839,086
[45] Oct. 1, 1974

[54] TEMPERATURE CONTROL SYSTEM FOR METAL SCRAP DRYERS

[75] Inventor: Charles R. Larson, Bellevue, Mich.

[73] Assignee: Prab Conveyors, Inc., Kalamazoo, Mich.

[22] Filed: Mar. 5, 1973

[21] Appl. No.: 337,884

Related U.S. Application Data
[62] Division of Ser. No. 237,131, March 22, 1972, Pat. No. 3,767,179.

[52] U.S. Cl.................... 134/19, 34/116, 134/18, 432/85
[51] Int. Cl............................................. B08b 1/04
[58] Field of Search........ 134/19, 2, 18, 41; 34/136, 34/116; 432/85

[56] References Cited
UNITED STATES PATENTS

| | | | |
|---|---|---|---|
| 2,851,042 | 9/1958 | Spence | 134/57 R |
| 2,852,418 | 9/1958 | MacDonald | 134/2 |
| 3,050,868 | 8/1962 | Erisman | 34/136 |
| 3,089,791 | 5/1963 | Stirling | 134/57 R |
| 3,299,526 | 1/1967 | Arnold | 34/136 |
| 3,544,367 | 12/1970 | Ehrlich | 134/19 |

Primary Examiner—Charles J. Myhre
Assistant Examiner—Daniel J. O'Connor
Attorney, Agent, or Firm—Gordon W. Hueschen; John T. Reynolds

[57] ABSTRACT

Method for temperature control within a rotating drum-type dryer treating metal scrap contaminated with combustible substances are disclosed. The apparatus for performing the method comprises a bank of water-injection nozzles within the dryer which are individually controlled by cam-actuated metering valves. A signal generated by a temperature sensing means situated within an exhaust gas stream emanating from the dryer determines the number of nozzles which are simultaneously activated in order to provide the desired cooling.

2 Claims, 5 Drawing Figures

TEMPERATURE CONTROL SYSTEM FOR METAL SCRAP DRYERS

This is a division of application Ser. No. 237,131, now U.S. Pat. No. 3,767,179, filed Mar. 22, 1972.

BACKGROUND OF INVENTION

This invention relates to treatment of metal scrap contaminated with combustible substances in a rotating drum-type dryer. The term "metal scrap" as used herein is taken to mean swarf, turnings, chips, or the like, generated during metal working operations with metals such as cast iron, aluminum and aluminum alloys, magnesium and magnesium alloys, and the like.

Reclamation of metal scrap by melting requires certain preparatory treatment for removal of oil, grease and similar other organic waste materials which are present as contaminants on the scrap. Such preparatory treatment is referred to in the art as drying and can be conveniently carried out in a dryer which is an elongated rotating drum, slightly sloping with respect to the horizontal. The scrap is introduced into the rotating drum at a relatively higher or input end, and upon rotation of the drum, the scrap travels downwardly toward the lower or output end of the drum. During the downward travel the scrap is contacted with hot gases which are generated by a burner situated at one end of the drum. The gases are sufficiently hot to evaporate the contaminating substances and to bring about at least a partial combustion thereof. If a sufficient amount of combustible contaminants are present, a self-supporting flame can be maintained within the dryer. However, it is necessary to exercise relatively close temperature control within the dryer in order to avoid oxidizing, fusing, or even melting of the scrap.

Nevertheless, temperature control in the dryer is quite difficult because the constitution and amount of contaminants in the scrap at any given time can vary greatly. In the case of oil contamination, for example, the amount of oil present can be as low as 3 weight percent or less, or as high as about 10 weight percent or more.

In such circumstances temperature control has been attempted by injecting water into the dryer whenever the temperature therein exceeds a predetermined limit. However, the available water pressure at any given installation is substantially constant, and, even with the use of a throttling valve, the maximum water input through a particular orifice reaches a constant value. The net effect of this condition is that water cannot be injected rapidly enough into the dryer and the temperature rises rapidly in the dryer using a practical water pipe or orifice size. On the other hand, if the orifice size is selected so as to accomodate the most severe temperature rise that can be reasonably expected, control over the injection of lesser amounts of water, intended to cope with less drastic conditions in the dryer, is lost.

It has also been attempted to control the dryer temperature by providing an outer jacket for the dryer and circulating temperature-conditioned gases around the exterior of the rotating drum, as shown in U.S. Pat. No. 3,346,417. However, this approach is somewhat cumbersome and also quite costly.

Accordingly, it is an object of the present invention to obviate the shortcomings of the existing prior art temperature control means and to provide an effective and reliable temperature control system.

It is a further object of the invention to provide a temperature control system utilizing water injection whereby a great flexibility is provided in the volume of water that can be injected at any given time even though the water pressure of the supply or source remains substantially constant.

Still other objects of this invention will readily present themselves to one skilled in the art upon reference to the ensuing specification, the accompanying drawings, and the claims.

SUMMARY OF THE INVENTION

The present invention contemplates a system comprising a water source, a plurality of nozzles situated within a rotary drum-type dryer, a cam-actuated metering valve for each nozzle, cam means for actuating the metering valves, cam drive means, a temperature sensing means, and a controller means.

The nozzles are connected to and communicate with the water source by means of conduits, each nozzle being provided with a separate conduit. The cam-actuated valve is situated in each conduit and regulates the water flow within the conduit to the respective nozzle. The cam drive means drives suitable cam means which are operably engaged with the metering valves and which are capable of simultaneous actuation of at least two of the metering valves. The temperature sensing means ascertains temperature within the dryer and is situated in an exhaust gas stream emanating from the dryer. The sensing means generates a signal depending on the gas stream temperature. A controller means is operably connected to the temperature sensing means and to the cam drive means and is adapted to cause actuation of at least two of the metering valves in response to a predetermined signal generated by the temperature sensing means.

The presently contemplated method for regulating temperature within the rotary drum-type dryer comprises the steps of providing a plurality of nozzles within the dryer, providing a reservoir of water at a substantially constant pressure, sensing temperature within the dryer and generating a signal which is indicative of the temperature in the dryer, and injecting water into the dryer simultaneously through two or more nozzles in response to the generated signal.

DESCRIPTION OF THE PREFERRED EMBODIMENTS

Figure 1:
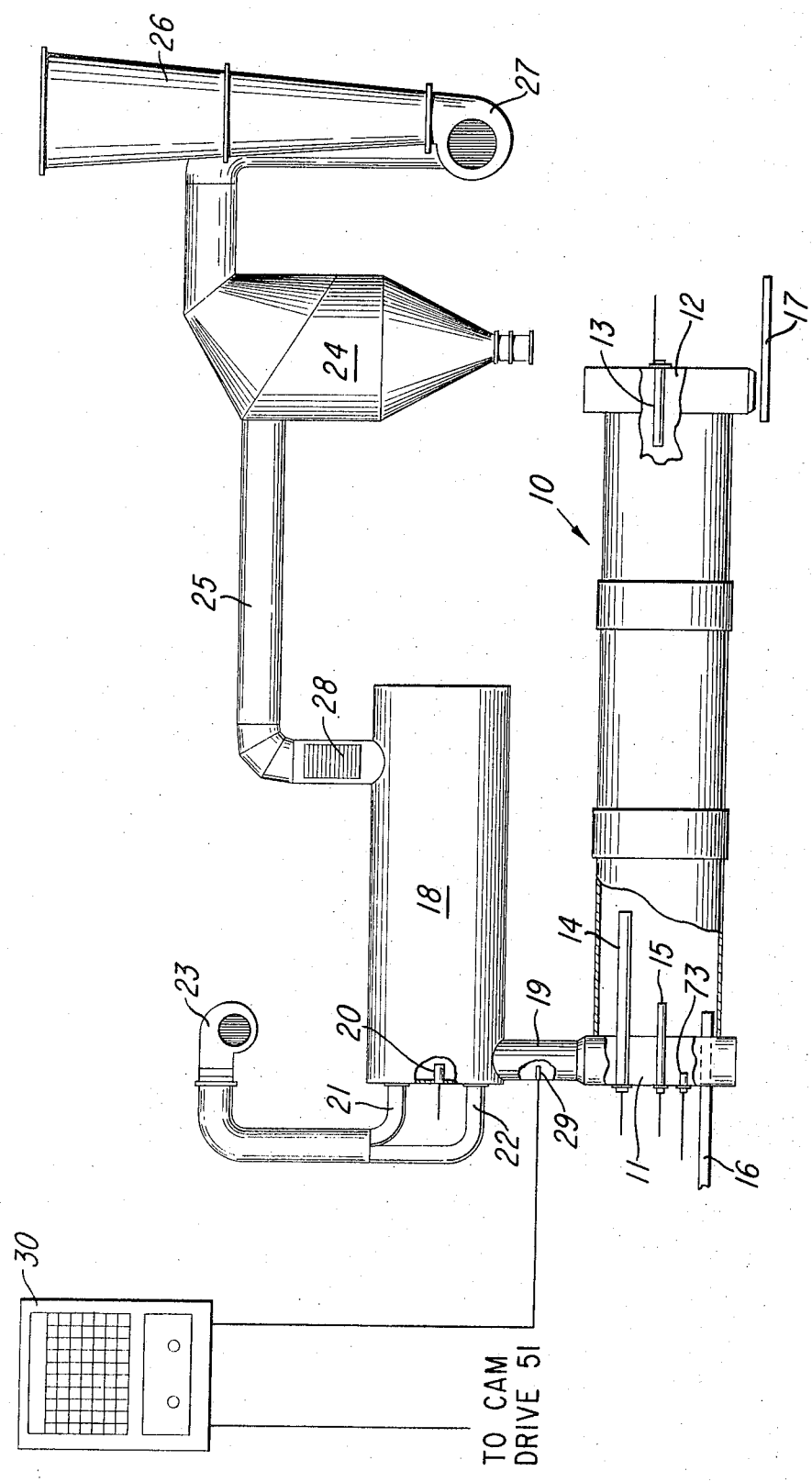
FIG. 1 is a side elevational view partly broken away, of a rotary drum-type dryer embodying the present invention.

Referring to FIG. 1, rotating drum dryer 10, having input end 11 and output end 12 is provided with preheat burner 13 situated at output end 12 and main burner 14 as well as auxiliary burner 15 situated at input end 11. Comminuted metal scrap is fed into dryer 10 by chip infeed conveyor 16 and dried metal scrap discharged at output end 12 is carried away by chip discharge conveyor 17.

Situated above dryer 10 is afterburner 18 which receives hot exhaust gases containing some combustible material from dryer 10 via connecting conduit 19. Afterburner 18 is provided with burner 20 and with secondary air inlets 21 and 22. Blower 23 provides driving force for the secondary air introduced into afterburner 18. Exhaust gases from afterburner 18 are fed into dust collector 24 via exhaust gas conduit 25 and from collector 24 to stack 26 equipped with stack blower 27. Draft is regulated in afterburner 18 by dampers 28 installed in exhaust gas conduit 25.

Temperature within dryer 10 is ascertained by measuring the temperature of the hot exhaust gases emanating therefrom. For this purpose thermocouple 29 is provided in connecting conduit 19. Thermocouple 19 is connected to controller 30 which in turn controls the injection of water into dryer 10 by nozzle bank 73.

Figure 2:
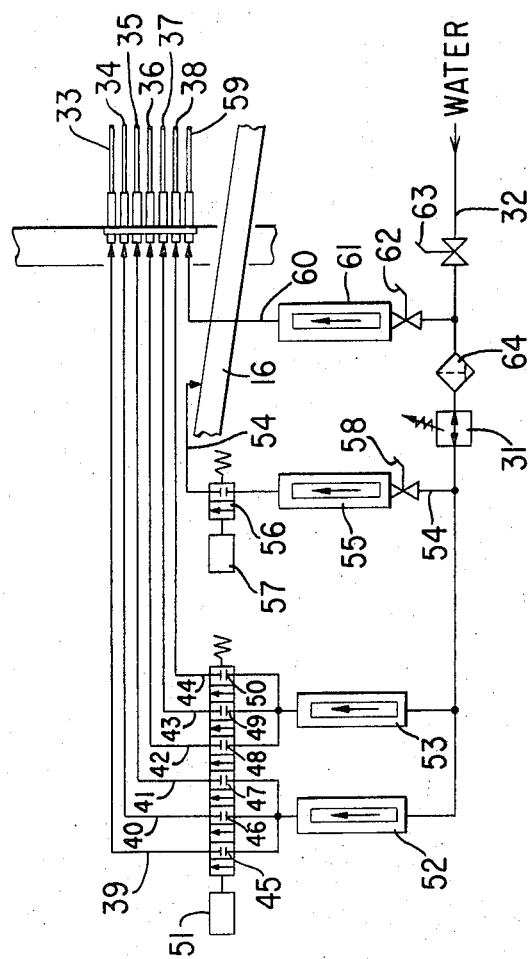
FIG. 2 is a schematic view of an embodiment of the water injection system of this invention.

An embodiment of the water-injection system of this invention is schematically shown in FIG. 2. From a common water source at substantially constant pressure as regulated by pressure regulator 31 in water supply line 32 water is supplied to a bank of six nozzles, i.e., nozzles 33, 34, 35, 36, 37 and 38, via conduits 39, 40, 41, 42, 43 and 44, respectively. A cam actuated metering valve is provided in each conduit and serves to control water flow to each nozzle. That is, metering valve 45 controls water flow to nozzle 33, metering valve 46 controls water flow to nozzle 34, metering valve 47 controls water flow to nozzle 35, metering valve 48 controls water flow to nozzle 36, metering valve 49 controls water flow to nozzle 37, and metering valve 50 controls water flow to nozzle 38. Actuating cams for the metering valves are driven by cam drive 51 which can be an electric motor or the like. The actuating cams are arranged so that at least two metering valves can be simultaneously actuated in response to a signal generated by thermocouple 29. Water flow to the nozzles can be monitored by suitable flow meters 52 and 53.

In addition, water supply line 32 also supplies pre-load water which is sprayed on metal scrap entering dryer 10 via chip infeed conveyor 16. Pre-load water is supplied via conduit 54 and flow is monitored by flow-meter 55. Control of pre-load water flow is achieved by metering valve 56 actuated by solenoid 57. In normal operation pre-load water is sprayed continuously on the metal scrap or chips entering dryer 10. Manual cut-off for preload water is provided by valve 58. Means for quenching dryer 10 in the event of a runaway situation is provided by high capacity nozzle 59 which is supplied with water via conduit 60. Flow through conduit 60 can be monitored by flowmeter 61 and initiated or shut off by using manual shut-off valve 62. Water supply line 32 is also provided with manually-operated valve 63 and with strainer filter 64.

Figure 5:
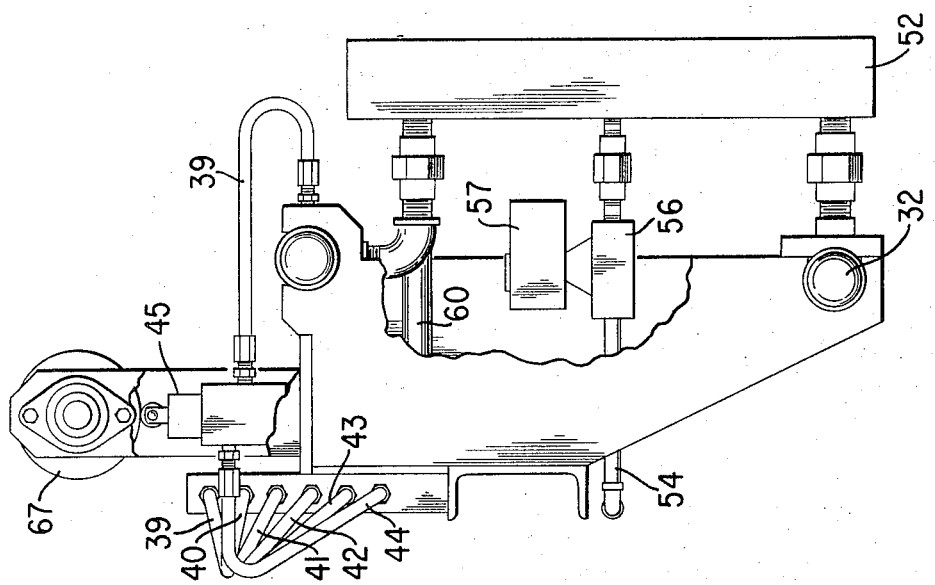
FIG. 5 is an end elevational view of the injection system shown in FIG. 4.
Figure 3:
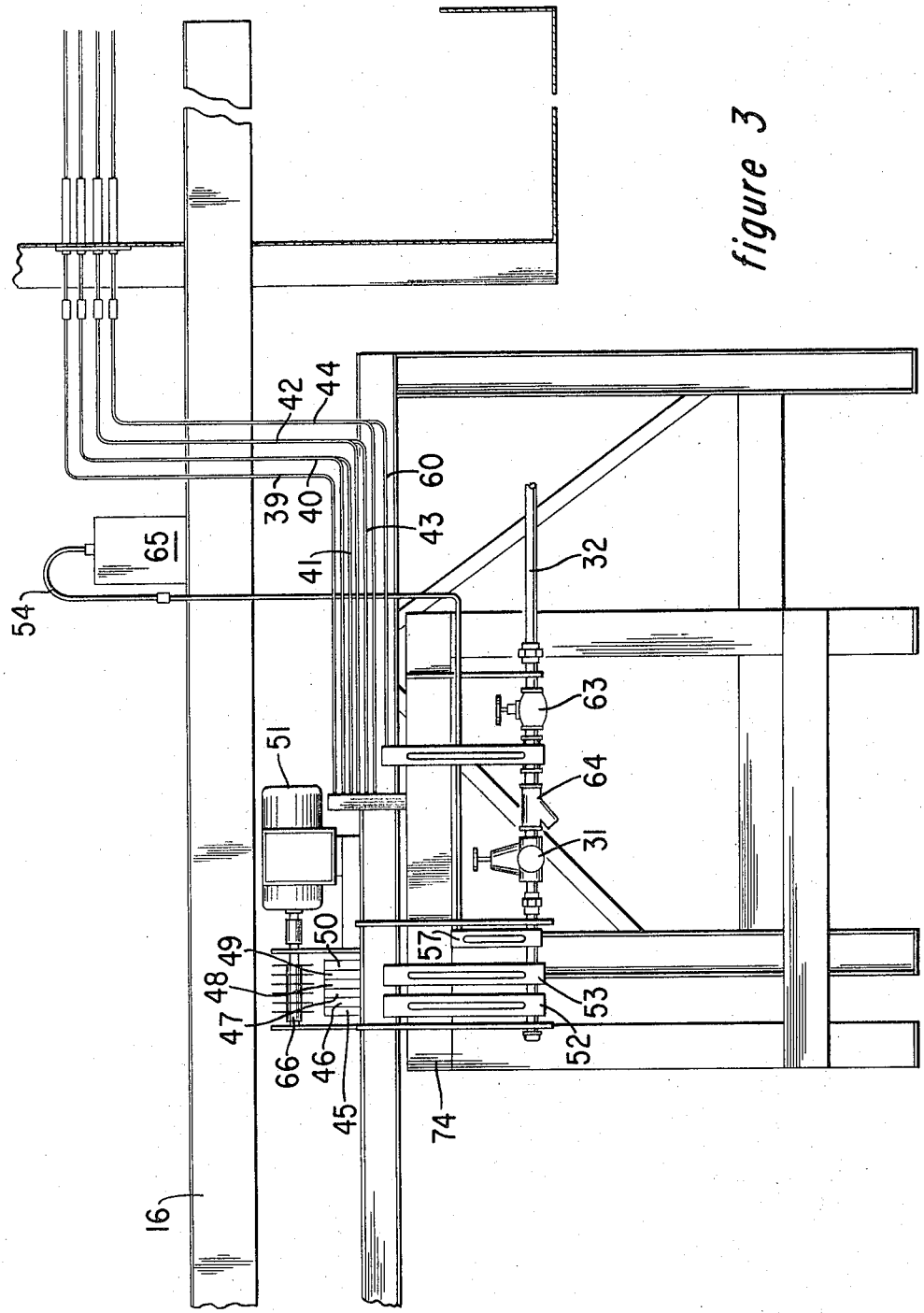
FIG. 3 is a side elevational view of the water injection system of this invention.
Figure 4:
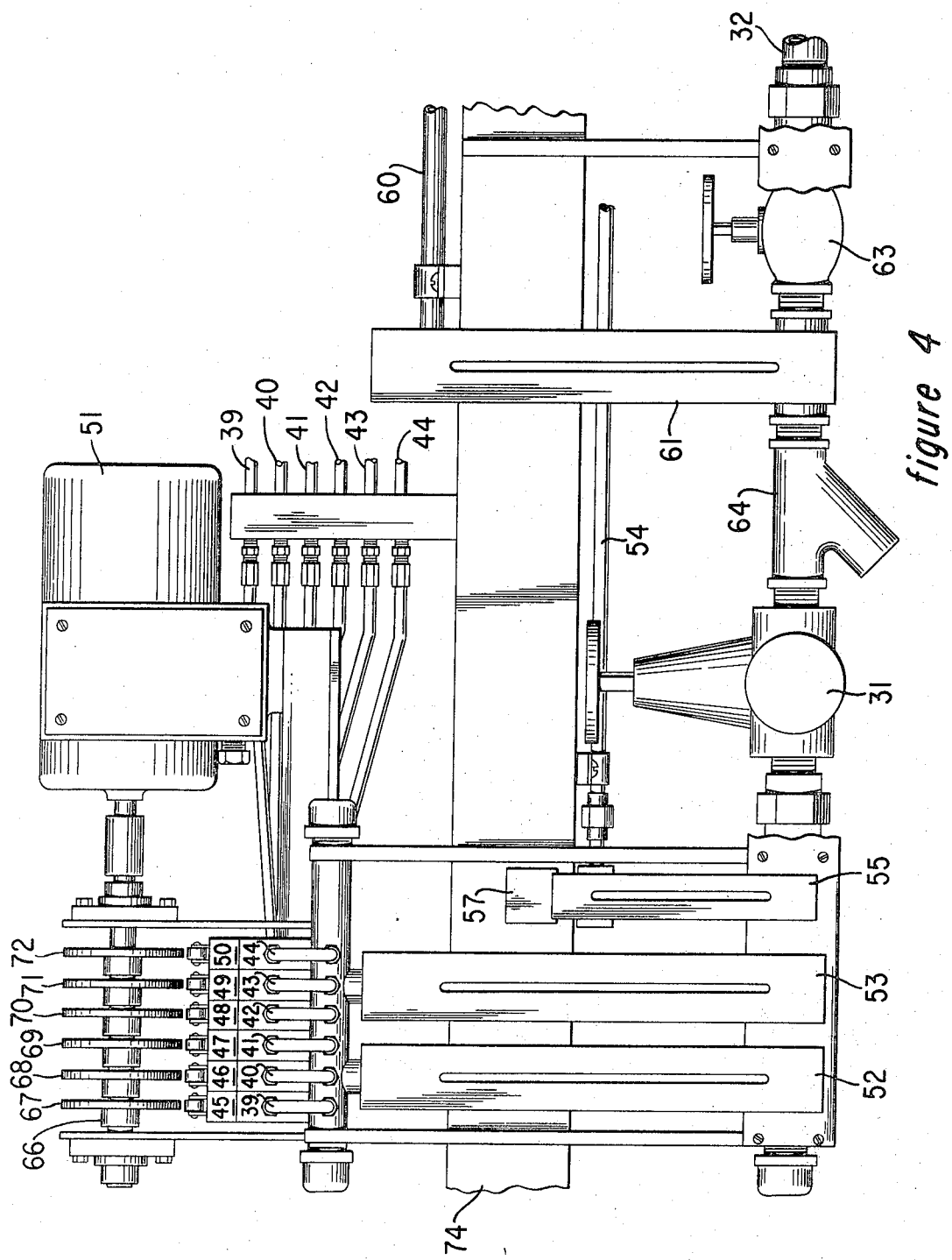
FIG. 4 is a partial side elevational view of the water injection system of this invention showing the metering valve arrangement and actuating means therefor.

Referring to FIGS. 3, 4 and 5 the valving means for the water injection system of this invention are mounted on frame 74 situated in a convenient location near dryer 10. Pre-load water to chip infeed conveyor 16 is distributed over the incoming metal scrap by means of spray header 65.

Cam means 66 is provided with a plurality of cam disks such as disk 67 for valve 45, disk 68 for valve 46, disk 69 for valve 47, disk 70 for valve 48, disk 71 for valve 49, and disk 72 for valve 50. The configuration of these cam disks is such that at least two of the metering valves can be actuated, i.e., opened, at any given time in response to a signal received from controller 30 (FIG. 1). The orifice size of the individual nozzles is chosen so that by an appropriate actuation of metering valves a wide range of volumetric capacities is achieved. Preferably a bank of six nozzles is used and the volumetric capacities of the individual nozzles selected so that the overall volumetric capacity is in a proportion of about 1:2:4:4:4:4. For example, one nozzle can have a capacity of 0.5 gallons per minute (GPM), another nozzle a capacity of 1 GPM, and a third nozzle a capacity of 2 GPM. By actuating the first and second nozzles an overall water flow rate into the dryer of 1.5 GPM is obtained, by actuating the third nozzle water can be supplied at 2 GPM, by actuating the first and third nozzles water can be supplied at 2.5 GPM, by actuating the second and third nozzles water can be supplied at 3 GPM, by actuating all three nozzles water can be supplied at 3.5 GPM. If additional nozzles having, for example, 2 GPM capacity are added to the nozzle bank, the foregoing capacity series can be extended upwardly to provide any desired water flow rate. Similarly, if it is desired to step down or step up the water flow rate in smaller increments, say 0.25 GPM, only one additional nozzle having a volumetric capacity of 0.25 GPM at the given water pressure has to be added to the nozzle bank.

During operation of the dryer under normal conditions, the temperature range for processing brass chips is about 700° to 800°F. If, due to the presence of a greater amount of contaminants on the chips, the temperature in the dryer begins to rise, this increase will be detected by thermocouple 29 which will signal controller 30. As the signal is received from the thermocouple, controller 30 energizes cam drive 51 which, in turn, positions cam disks 67 through 72 so that two or more of metering valves 45 through 50 are actuated, depending on the severity and/or rapidity of the temperature rise, to cause the desired quenching effect.

The present discussion and the accompanying drawings are intended as illustrative and are not to be construed as limiting. Still other variations and rearrangement of parts within the spirit and scope of this invention are possible and will become apparent to one skilled in the art.

I claim:

1. A method for regulating temperature within a rotary drum-type dryer treating at an elevated temperature metal scrap contaminated with combustible substances which comprises:

providing a plurality of nozzles having different orifice sizes in at least two individual nozzles to provide a range of delivered water volumetric capacities at constant water pressure within said dryer;

providing a reservoir of water at a substantially constant pressure;

sensing temperature within said dryer and generating a signal which is indicative of the temperature within said dryer; and injecting water into the dryer simultaneously through at least two nozzles in response to the generated signal.

2. The method of claim 1 wherein a bank of six nozzles is provided and wherein water is injected simultaneously through at least two of the six nozzles, the particular combination of nozzles in use at a given time being determined by said generated signal, and the volumetric capacity of the nozzles is in the proportion of about 1:2:4:4:4:4.

* * * * *